United States Patent [19]

Sabisch et al.

[11] Patent Number: 4,461,939

[45] Date of Patent: Jul. 24, 1984

[54] SWITCHGEAR WITH Z-SHAPED INSULATING TERMINAL COVER

[75] Inventors: Willy Sabisch, Theuern; Friedrich Hufnagel, Sulzbach-Rosenberg, both of Fed. Rep. of Germany

[73] Assignee: Siemens Aktiengesellschaft, Berlin & Munich, Fed. Rep. of Germany

[21] Appl. No.: 364,976

[22] Filed: Apr. 2, 1982

[30] Foreign Application Priority Data

Apr. 14, 1981 [DE] Fed. Rep. of Germany ....... 3115100

[51] Int. Cl.$^3$ ......................... H01H 9/02; H02B 1/14; H01R 13/44

[52] U.S. Cl. ................................ 200/304; 174/138 F; 361/376

[58] Field of Search ........................... 174/5 R, 138 F; 200/304; 339/36, 116 R, 198 J; 361/376, 350, 351, 353, 354, 363

[56] References Cited

U.S. PATENT DOCUMENTS 3,200,191 8/1965 Davies et al. ............... 174/138 F X
3,596,142 7/1971 Campanini .................. 174/138 F X

FOREIGN PATENT DOCUMENTS 2914507 6/1980 Fed. Rep. of Germany ... 174/138 F
2277447 1/1976 France ................................ 339/36

*Primary Examiner*—Laramie E. Askin
*Attorney, Agent, or Firm*—Kenyon & Kenyon

[57] ABSTRACT

A cover for protecting connecting leads and terminals of a switchgear, which extend to one side of the switchgear from an upper part, is made in the shape of a Z. One arm of the Z extends upwards, parallel to the outside wall of the upper part and the other arm of the Z extends downwards and covers the region of the terminals. The first arm is provided wih outward facing grooves or slots which have spacings like the spacings between the connecting leads when they are connected to the terminals. When the switchgear is disconnected from the leads and removed from the mounting, the Z-shaped cover is reversed and fastened to the mounting in its place. Since the leads are more or less rigid, the covering now extends over and protects them. Thus, the same cover, by simple reorientation, serves to protect the connecting leads when they are connected to the switchgear and when the switchgear is not in place.

4 Claims, 10 Drawing Figures

SWITCHGEAR WITH Z-SHAPED INSULATING TERMINAL COVER

BACKGROUND OF THE INVENTION

This invention relates to protective covers for use over terminals and leads in electrical switchgear in which an upper part of the switchgear is set back from that part of the switchgear which contains the terminals, pointing away from the mounting side.

In a known switchgear of the above-mentioned gear (DE-AS 29 14 507) individual covers for the terminals and their connecting leads are attached to the terminals of the equipment. When the equipment is removed, the connecting leads are uncovered and remain exposed because the covers, when disassembled to permit disconnection, cannot be fastened to the leads without the equipment being in place.

It is an object of the invention to provide a protective covering for terminals which makes it possible to cover at least the exposed ends of the leads even after the switchgear is removed.

SUMMARY OF THE INVENTION

According to the invention, this object is achieved by shaping a single cover in the form of a Z and extending one arm of the Z upwards, parallel to the adjacent boundary wall of the set-back upper part of the switchgear, and covering the region of the terminals with the other arm of the Z. When the switchgear has been removed, the covering can be reversed to shield the leads. In order to provide electrical isolation of the individual conductors from each other, it is advantageous to provide the first Z-arm with outwardly directed, slot-shaped cutouts. To avoid the need to provide additional fastening means for the covering when the switchgear is removed, it is advantageous to fasten the switchgear to a standardized bar and to provide outward directed parts on the second arm for fastening to the bar. Additional spacers or adapters for fastening the cover down with the switchgear removed are dispensed with by making the distance which the first arm is spaced from the second arm such that, when the second arm is fastened to the fastening means for the switchgear, the slot-shaped cutouts on the first Z-arm cover the ends of the leads. The terminal cover of the invention can also be used to advantage when the plane on which the switchgear is mounted is provided by a bus bar adapter.

BRIEF DESCRIPTION OF THE DRAWINGS

FIGS. 9 and 10 are side and end views, respectively, of a switchgear with connecting leads which are not angled and of a cover modified to receive the leads straight on.

DETAILED DESCRIPTION OF THE INVENTION

Figure 1:
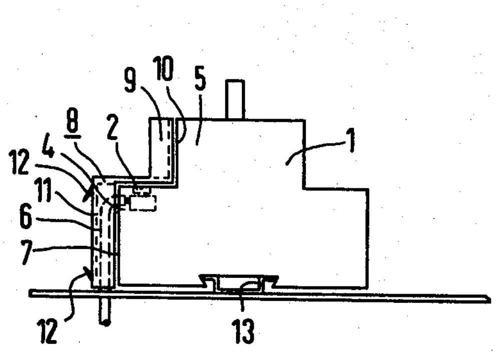
FIGS. 1 and 2 are side and top views, respectively, of a switchgear fastened to a standardized bar and having a terminal cover fabricated according to the invention.
Figure 3:
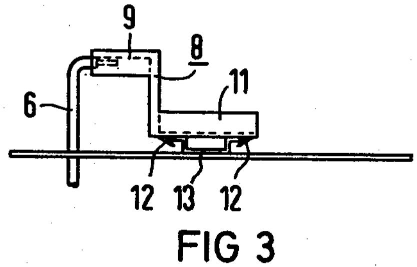
FIGS. 3 and 4 are side and end views, respectively, of the terminal cover fastened to the standardized bar of FIG. 1, with the switchgear removed.
Figure 4:
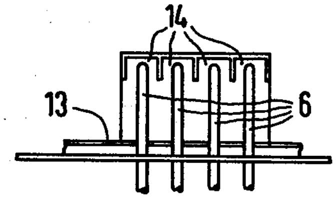
Figure 2:
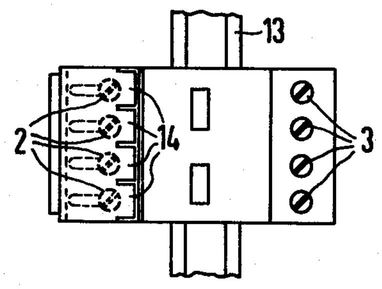
Figure 5:
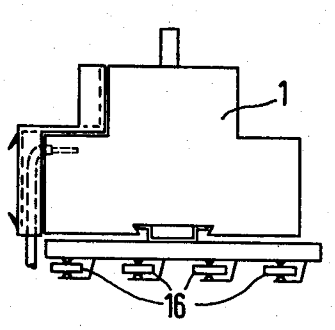
FIGS. 5 and 6 are side and top views, respectively, of a switchgear with the cover fastened to a bus bar adapter.
Figure 7:
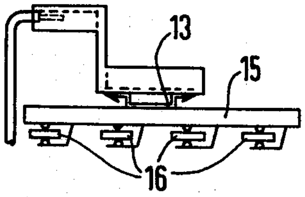
FIGS. 7 and 8 are side and end views, respectively, of the cover mounted on the bus bar adapter plate.
Figure 8:
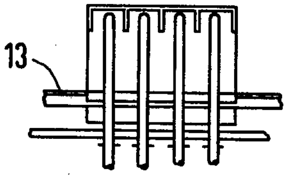
Figure 6:
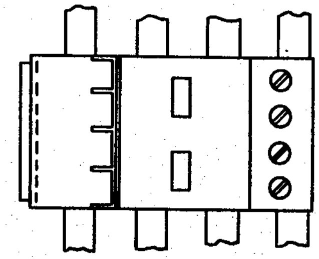

A switchgear 1 shown in the drawing can be, for example, a protective circuit breaker for a motor. Switchgear 1 is provided with sets of terminals 2 and 3; terminals 2 serve for input current and terminals 3 serve for the output. Switchgear 1 has upper part 5 which is set back from input terminal region 4. Terminal connecting leads 6 (FIGS. 1–4) are bent downwards after they leave terminals 2 and then extend parallel to sidewall 7 of the lower part of switchgear 1. One Z-arm 9 of Z-shaped cover 8 lies parallel to boundary wall 10 of set-back upper switchgear part 5. The other Z-arm 11 covers terminal region 4, i.e., it lies parallel to sidewall 7 of switchgear 1 and covers the ends of connecting leads 6. It can be fastened in place by snapping onto the wires or by some other kind of snap-on connection. Mounting parts 12, designed to mount on standardized bar 13, are mounted on the second Z-arm 11, facing away from terminal area 4, and serve for snap fastening cover 8. Bar 13 has a standardized profile, as shown in FIGS. 3 and 4, and receives the Z-arm when switchgear 1 has been disconnected from the connecting leads and dismounted. First Z-arm 9 is provided with outward facing slots or cutouts 14 which are separated by partions and which are arranged, as to number and spacing, to cover and insulate the stripped, bent-over ends of connecting leads 6 against accidental contact with each other when the switchgear unit is removed (See FIGS. 3 and 7). The spacing of the first arm from the second Z-arm 11 is chosen so that, when standardized bar mounting parts 12 are snapped onto the standardized bar, the level of slot-shaped recesses 14 corresponds to that of the bent-over ends of connecting leads 6; additional fasteners are not needed.

If, after cover 8 is first taken off, switchgear 1 is removed, cover 8 can then be simply snapped onto standardized bar 13 by means of mounting parts 12, and the bare ends of leads 6 are immediately protected against contact with each other and from the outside.

Figure 9:
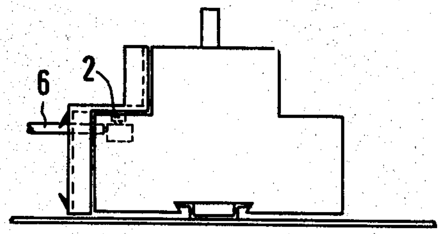
Figure 10:
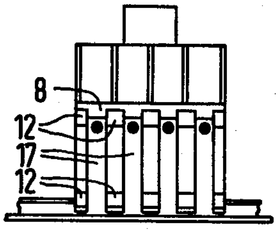

The embodiment illustrated in FIGS. 5 to 8 has a design which is similar to principle to that used with the switchgear and cover of FIGS. 1 to 4. In this instance, however, bus bar adapter 15 is mounted on bus bars 16 and standardized mounting bar 13 is carried on the adapter. In the embodiment of FIGS. 9 and 10, the incoming connecting leads 6 are dressed and inserted straight on into terminals 2, e.g. without being bent at right angles, as in the preceding embodiments. To permit cover 8 to be fitted on the switchgear, longitudinal slots 17 are cut in the material of second Z-arm 11 to receive connecting leads 6. In this embodiment, standard bar mounting parts 12 are made of individual short pieces fastened to the material of the Z-bar between slots 17. While such pieces are shown attached between each slot 17, it will be noted that, in many cases, it would be sufficient to provide these pieces only at the end walls of the slotted portion.

What is claimed is:

1. In combination, electrical switch gear disposed on a standardized mounting, said switch gear comprising a terminal region having a plurality of spaced terminals and an adjacent upper part with a boundary wall set back from the terminal region; a plurality of spaced connecting leads connected to respective said spaced terminals; a Z-shaped body of insulating material with a first arm of the body extending parallel to said boundary wall of said upper part of the switch gear adjacent said boundary wall and a second arm, spaced from said first arm, covering said terminal region; said first arm having an outer surface facing away from said boundary wall, said outer surface containing outward facing longitudinal slots, said slots being at least equal in number to the number of connecting leads at said terminal region, and said slots spaced apart an amount equal to the spacing of said connecting leads; said second arm having an outer surface facing away from said switch gear, said outer surface containing mounting parts for connecting to a said standardized mounting.

2. Apparatus according to claim 1, wherein the spacing of said second arm from said first arm is such that said cover may be mounted on said standardized mounting, with said switch gear removed, such that said connecting leads are covered by said first arm.

3. Apparatus according to claim 1, and further including a bus bar adaptor on which said standardized mounting is carried and wherein said mounting parts on said Z-shaped body are positioned to mount said Z-shaped body on said standardized mounting carried by bus bar adaptor instead of said switch gear.

4. In combination, electrical switch gear mounted on a standardized mounting, said switch gear having a terminal region with a plurality of spaced terminals and an adjacent upper part with a boundary wall set back from the terminal region; a plurality of spaced connecting leads connected to respective said spaced terminals; a cover comprising a Z-shaped body of insulating material, said cover having an inner surface and an outer surface, a first arm of said body extending parallel to said boundary wall with its inner surface adjacent said boundary wall and a second arm of said body covering said terminal region with its inner surface; outward facing longitudinal slots in the outer surface of said first arm, said slots at least equal in number to the number of said plurality of connecting leads at said terminal region, said slots spaced apart such as to be able to receive said connecting leads; mounting parts for connecting to said standardized mounting on the outer surface of said second arm; the spacing of said first arm from said second arm being such that when said cover is mounted on said standarized mounting instead of on said switch gear, the connecting leads will be covered by said first arm.

* * * * *